(12) United States Patent
Taruya et al.

(10) Patent No.: US 9,761,896 B2
(45) Date of Patent: Sep. 12, 2017

(54) METHOD FOR STOPPING FUEL CELL SYSTEM AND FUEL CELL SYSTEM (71) Applicant: HONDA MOTOR CO., LTD., Tokyo (JP)

(72) Inventors: Kenji Taruya, Wako (JP); Yuji Matsumoto, Wako (JP); Nobuki Koiwa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 68 days.

(21) Appl. No.: 14/749,640

(22) Filed: Jun. 25, 2015

(65) Prior Publication Data

US 2015/0380753 A1 Dec. 31, 2015

(30) Foreign Application Priority Data

Jun. 27, 2014 (JP) .................................. 2014-133194

(51) Int. Cl.

| | |
|---|---|
| *H01M 8/04223* | (2016.01) |
| *H01M 8/04228* | (2016.01) |
| *H01M 8/04791* | (2016.01) |
| *H01M 8/04955* | (2016.01) |
| *H01M 8/04858* | (2016.01) |
| *H01M 8/04537* | (2016.01) |
| *H01M 8/1018* | (2016.01) |

(52) U.S. Cl.
CPC ... *H01M 8/04223* (2013.01); *H01M 8/04537* (2013.01); *H01M 8/04574* (2013.01); *H01M 8/04798* (2013.01); *H01M 8/04865* (2013.01); *H01M 8/04895* (2013.01); *H01M 2008/1095* (2013.01); *H01M 2250/20* (2013.01); *Y02T 90/32* (2013.01)

(58) Field of Classification Search
None
See application file for complete search history.

(56) References Cited

U.S. PATENT DOCUMENTS

2009/0035630 A1* 2/2009 Kumada ........... H01M 8/04238
429/430

FOREIGN PATENT DOCUMENTS

| JP | 08-195210 | 7/1996 |
|---|---|---|
| JP | 2004-186137 | 7/2004 |
| JP | 2013-149538 | 8/2013 |

OTHER PUBLICATIONS

Japanese Office Action for corresponding JP Application No. 2014-133194, Nov. 1, 2016 (w/ English machine translation).

* cited by examiner

*Primary Examiner* — Yoshitoshi Takeuchi
(74) *Attorney, Agent, or Firm* — Mori & Ward, LLP (57) ABSTRACT

A method for stopping a fuel cell system includes supplying a fuel gas containing a fuel to an anode of a fuel cell which is to generate electric power. An oxidant gas containing an oxidant is supplied to a cathode of the fuel cell. A concentration of the oxidant gas in the cathode is reduced. An output voltage of the fuel cell is lowered while a slope of a change in the output voltage with respect to elapsed time is controlled such that an output current of the fuel cell has a predetermined relationship with a predetermined current reference value.

4 Claims, 7 Drawing Sheets

METHOD FOR STOPPING FUEL CELL SYSTEM AND FUEL CELL SYSTEM

CROSS-REFERENCE TO RELATED APPLICATIONS

The present application claims priority under 35 U.S.C. §119 to Japanese Patent Application No. 2014-133194, filed Jun. 27, 2014, entitled "Method for Stopping Power Generation in Fuel Cell System." The contents of this application are incorporated herein by reference in their entirety.

BACKGROUND

1. Field

The present disclosure relates to a method for stopping a fuel cell system and a fuel cell system.

2. Description of the Related Art

Examples of a fuel cell unit in a fuel cell system mounted on a fuel cell vehicle include a fuel cell stack formed by stacking a plurality of cells. Each of the cells includes an anode, a cathode, a solid polymer electrolyte membrane, such as a solid polymer ion-exchange membrane, interposed between the anode and the cathode, and a pair of separators disposed on respective outer sides of the anode and the cathode.

The fuel cell unit generates electric power by using, as a fuel gas, a hydrogen gas supplied through a fuel supply passage to the anode of each cell and also using, as an oxidant gas, air containing oxygen supplied through an oxidant supply passage to the cathode of each cell. The fuel supply passage is provided with a hydrogen shutoff valve that permits or shuts off the supply of hydrogen gas, and the oxidant supply passage is provided with an air shutoff valve that permits or shuts off the supply of air.

In the fuel cell unit configured as described above, hydrogen ions generated by catalysis at the anode travel through the solid polymer electrolyte membrane to the cathode, where the hydrogen ions electrochemically react with oxygen to generate electric power.

It is known that a so-called crossover occurs in a fuel cell unit of this type. The crossover is a phenomenon in which, in the process of stopping power generation, the hydrogen gas remaining on the anode side in the fuel cell unit passes through the solid polymer electrolyte membrane and diffuses to the cathode side, whereas oxygen and nitrogen gases in the air on the cathode side pass through the solid polymer electrolyte membrane and diffuse to the anode side. The crossover may cause an electrochemical reaction between reaction gases near the solid polymer electrolyte membrane, and this may deteriorate the solid polymer electrolyte membrane.

A technique is disclosed as a solution to this. In this technique, in the process of stopping power generation of a fuel cell unit, an air off-gas discharged from a cathode of the fuel cell unit is recirculated and supplied to the cathode, so as to continue the power generation using residual oxygen in the air off-gas. The power generation is stopped when a power generation voltage becomes lower than a predetermined value.

During normal power generation or during power generation using residual oxygen in air off-gas, a hydrogen shutoff valve and an air shutoff valve are open. These shutoff valves are closed at the end of the process of stopping the power generation. This can prevent additional hydrogen from entering an anode side of the fuel cell unit, and can also prevent additional air from entering a cathode side of the fuel cell unit. Thus, since the cathode side can be kept in a nitrogen-rich state where the oxygen concentration is very low, it is possible to reduce damage to a solid polymer electrolyte membrane (see, e.g., Japanese Unexamined Patent Application Publication Nos. 8-195210 and 2013-149538).

SUMMARY

According to one aspect of the present invention, a method for stopping a fuel cell system includes lowering an output voltage of the fuel cell unit while controlling a slope of a temporal change in the output voltage such that an output current of the fuel cell unit has a predetermined relationship with a predetermined current reference value. The fuel cell system includes a fuel cell unit, a fuel gas supply unit, an oxidant gas supply unit, and an oxidant gas concentration reducing unit. The fuel cell unit is configured to generate electric power using a fuel in an anode and an oxidant in a cathode. The fuel gas supply unit is configured to supply a fuel gas containing the fuel to the anode. The oxidant gas supply unit is configured to supply an oxidant gas containing the oxidant to the cathode. The oxidant gas concentration reducing unit is configured to reduce a concentration of the oxidant gas in the cathode.

According to another aspect of the present invention, a method for stopping a fuel cell system includes supplying a fuel gas containing a fuel to an anode of a fuel cell which is to generate electric power. An oxidant gas containing an oxidant is supplied to a cathode of the fuel cell. A concentration of the oxidant gas in the cathode is reduced. An output voltage of the fuel cell is lowered while a slope of a change in the output voltage with respect to elapsed time is controlled such that an output current of the fuel cell has a predetermined relationship with a predetermined current reference value.

According to further aspect of the present invention, a fuel cell system includes a fuel cell, a fuel gas supply device, an oxidant gas supply device, an oxidant gas concentration reducing device, and a controller. The fuel cell is to generate electric power using a fuel in an anode and an oxidant in a cathode. The fuel gas supply device is to supply a fuel gas containing the fuel to the anode. The oxidant gas supply device is to supply an oxidant gas containing the oxidant to the cathode. The oxidant gas concentration reducing device is to reduce a concentration of the oxidant gas in the cathode. The controller is to lower an output voltage of the fuel cell while controlling a slope of a change in the output voltage with respect to elapsed time such that an output current of the fuel cell has a predetermined relationship with a predetermined current reference value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

A control method for a fuel cell system according to an embodiment will now be described with reference to the attached drawings.

Figure 1:
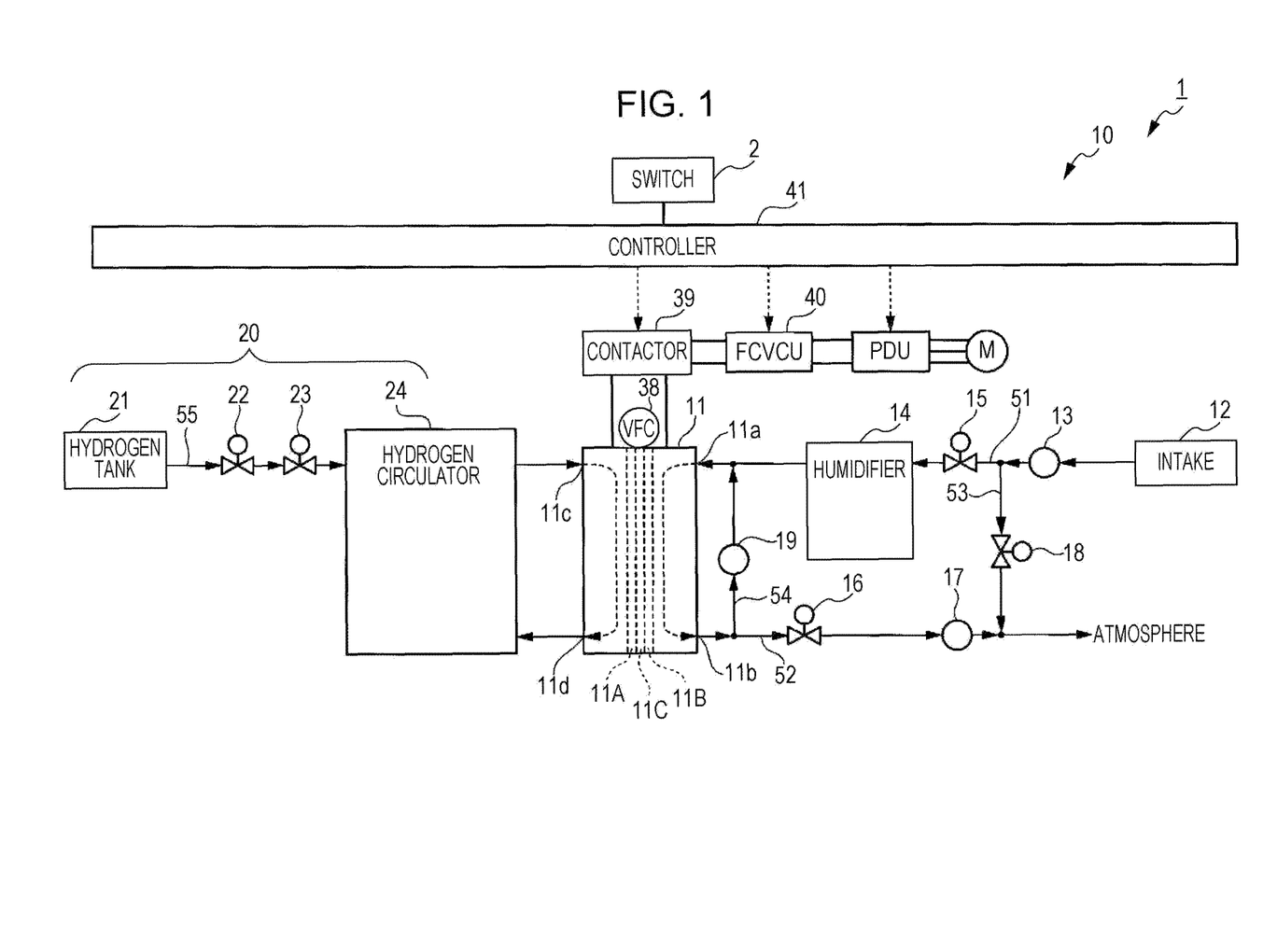
FIG. 1 illustrates a configuration of a fuel cell system according to an embodiment.

FIG. 1 illustrates a configuration of a fuel cell system 10 according to an embodiment. For example, the fuel cell system 10 of the present embodiment is mounted, as a power supply, on a vehicle 1 which includes a traction motor M and a power drive unit PDU that controls the traction motor M.

The vehicle 1 includes a switch 2, such as an ignition switch, configured to output a start signal that instructs the vehicle 1 to start, or a stop signal that instructs the vehicle 1 to stop, in accordance with an input operation of the driver.

As illustrated in FIG. 1, the fuel cell system 10 includes a fuel cell stack 11, an intake 12, an air pump 13, a humidifier 14, a sealing inlet valve 15, a sealing outlet valve 16, a pressure control valve 17, a bypass valve 18, an exhaust gas recirculation pump 19, a hydrogen tank 21, a hydrogen supply valve 22, a shutoff valve 23, a hydrogen circulator 24, a current sensor (not shown), a voltage sensor 38, a contactor 39, a voltage regulator (FCVCU) 40, and a controller 41.

The fuel cell stack 11 includes a layered body (not shown) formed by stacking a plurality of fuel cells, and a pair of end plates (not shown) between which the layered body is sandwiched from both sides in the stacking direction.

Each of the fuel cells includes a membrane electrode assembly (MEA), and a pair of separators between which the membrane electrode assembly is sandwiched from both sides in the assembling (or joining) direction.

The membrane electrode assembly includes a fuel electrode (anode) 11A formed by an anode catalyst and a gas diffusion layer, an oxygen electrode (cathode) 11B formed by a cathode catalyst and a gas diffusion layer, and a solid polymer electrolyte membrane 11C formed by a cation exchange membrane or the like sandwiched between the anode 11A and the cathode 11B on both sides thereof in the thickness direction.

A fuel gas (reaction gas) containing hydrogen as a fuel is supplied from the hydrogen tank 21 to each anode 11A in the fuel cell stack 11, and air which is an oxidant gas (reaction gas) containing oxygen as an oxidant is supplied from the air pump 13 to each cathode 11B in the fuel cell stack 11.

The hydrogen supplied to the anode 11A is ionized on the anode catalyst by a catalytic reaction, and the hydrogen ions travel to the cathode 11B through the solid polymer electrolyte membrane 11C which is moderately humidified. Electrons generated as the hydrogen ions travel can be taken out as a direct current to an external circuit (e.g., the voltage regulator 40).

The hydrogen ions travelling from the anode 11A onto the cathode catalyst of the cathode 11B react with the oxygen supplied to the cathode 11B and also with the electrons on the cathode catalyst to form water.

Reference electrodes (not shown), such as dynamic hydrogen electrodes (DHEs), may be connected to the respective fuel cells of the fuel cell stack 11.

With a reference electrode, it is possible to measure the potential of the anode 11A (anode potential) relative to a reference potential, such as the potential of hydrogen (0 V), and output a signal representing the measurement result to the controller 41.

All the fuel cells may be provided with respective reference electrodes, or only one or more predetermined ones of the fuel cells may be provided with one or more reference electrodes.

The air pump 13 includes a motor whose drive is controlled by the controller 41. The air pump 13 uses driving force of the motor to take in air from the outside through the intake 12, compresses the air, and sends the compressed air into an oxidant gas supply passage 51 connected to the cathode 11B.

The sealing inlet valve 15 is provided in the oxidant gas supply passage 51 that connects the air pump 13 to a cathode inlet 11a which allows supply of air to the cathode 11B in the fuel cell stack 11. The sealing inlet valve 15 is capable of opening and closing the oxidant gas supply passage 51 under the control of the controller 41, and the cathode 11B can be sealed with the sealing inlet valve 15.

The sealing outlet valve 16 is provided in an oxidant gas discharge passage 52 that connects a cathode outlet 11b which allows discharge of an exhaust gas (cathode off-gas, such as air) out of the cathode 11B in the fuel cell stack 11, to an outlet for discharging the exhaust gas to the outside (e.g., into the atmosphere). The sealing outlet valve 16 is capable of opening and closing the oxidant gas discharge passage 52 under the control of the controller 41, and the cathode 11B can be sealed with the sealing outlet valve 16.

For example, by drawing a current out of the fuel cell stack 11 after the cathode 11B is sealed with the sealing inlet valve 15 and the sealing outlet valve 16, oxygen in the sealed passage is consumed and its concentration can be reduced. This means that an oxidant gas concentration reducing unit is formed by at least the sealing inlet valve 15 and the sealing outlet valve 16.

The humidifier 14 humidifies air (cathode gas) supplied from the air pump 13 into the oxidant gas supply passage 51. Specifically, the humidifier 14 includes a water permeable membrane, such as a hollow fiber membrane, through which the humidifier 14 brings the air from the air pump 13 into contact with water so as to add moisture to the air (cathode gas).

The humidifier 14 including a water permeable membrane, such as a hollow fiber membrane, may be configured to use, as a gas for humidification, an exhaust gas (cathode off-gas, such as air) discharged through the cathode outlet 11b of the fuel cell stack 11 into the oxidant gas discharge passage 52, so as to humidify air (cathode gas) supplied from the air pump 13 into the oxidant gas supply passage 51.

The pressure control valve 17 is provided in the oxidant gas discharge passage 52. Under the control of the controller 41, the pressure control valve 17 controls the pressure of a cathode off-gas circulating in the oxidant gas discharge passage 52.

The exhaust gas recirculation pump 19 is provided in an exhaust gas recirculation passage 54 that connects a line between the sealing inlet valve 15 and the cathode inlet 11a in the oxidant gas supply passage 51 to a line between the cathode outlet 11b and the sealing outlet valve 16 in the oxidant gas discharge passage 52.

The exhaust gas recirculation pump 19 causes at least part of a cathode off-gas passing through the cathode 11B in the fuel cell stack 11 and discharged through the cathode outlet 11b into the oxidant gas discharge passage 52, to flow in the exhaust gas recirculation passage 54. Then, the exhaust gas recirculation pump 19 mixes the cathode off-gas circulating in the exhaust gas recirculation passage 54 with air (cathode gas) circulating from the sealing inlet valve 15 through the oxidant gas supply passage 51 to the cathode inlet 11a, and supplies the mixed gas to the cathode 11B again.

The hydrogen tank 21 is capable of storing compressed hydrogen and supplying hydrogen.

The hydrogen supply valve 22 is provided in a fuel gas supply passage 55 that connects the hydrogen tank 21 to the anode inlet 11c which allows supply of hydrogen to the anode 11A in the fuel cell stack 11. The hydrogen supply valve 22 supplies, from the hydrogen tank 21 to the fuel gas supply passage 55, hydrogen having a pressure corresponding to control of the controller 41, or to a signal pressure based on the pressure of air from the air pump 13.

The shutoff valve 23 is provided in the fuel gas supply passage 55 and is located between the hydrogen supply valve 22 and the anode inlet 11c. The shutoff valve 23 is capable of shutting off the fuel gas supply passage 55 under the control of the controller 41.

The hydrogen circulator 24 recirculates, through the fuel gas supply passage 55, hydrogen supplied through the anode inlet 11c to the fuel cell stack 11 and discharged through the anode outlet 11d.

The hydrogen tank 21, the hydrogen supply valve 22, the shutoff valve 23, and the hydrogen circulator 24 are collectively referred to as a fuel gas supply unit 20.

The current sensor (not shown) detects a current IFC supplied from the fuel cell stack 11 to an electrical load (e.g., power drive unit PDU), and outputs a signal indicating the detection result to the controller 41.

The voltage sensor 38 detects a voltage (i.e., total voltage which is the sum of voltages of the fuel cells) VFC between the positive and negative electrodes of the fuel cell stack 11, and outputs a signal indicating the detection result to the controller 41.

The contactor 39 is connected to the positive and negative electrodes of the fuel cell stack 11. The contactor 39 opens and closes the connection between the fuel cell stack 11 and the electrical load (e.g., power drive unit PDU) under the control of the controller 41.

The voltage regulator (FCVCU) 40 is interposed between the electrical load and the positive and negative electrodes of the fuel cell stack 11, with the contactor 39 interposed between the voltage regulator 40 and the fuel cell stack 11. The voltage regulator 40 regulates the voltage and current output from the fuel cell stack 11, under the control of the controller 41.

The controller 41 controls the operation of the fuel cell system 10 on the basis of a signal output from the switch 2 and signals indicating detection results output from the current sensor, the voltage sensor 38, and other sensors (not shown).

The fuel cell system 10 may include not only electrical devices, such as the traction motor M and an electrical storage (not shown) mounted on the vehicle 1, but also an electrical load (e.g., a discharge resistor or an electronic load) capable of opening and closing the connection to the fuel cell stack 11 and capable of changing the load current under the control of the controller 41. In this case, the controller 41 can control discharge during power generation of the fuel cell stack 11 by controlling discharge to the electrical load.

(Control Operation of Controller of Fuel Cell System)

A configuration of the fuel cell stack 11 according to the present embodiment has been described. A control operation performed by the controller 41 of the fuel cell system 10 (i.e., a control method for the fuel cell system 10) will now be described with reference to FIGS. 2 and 3.

Figure 2:
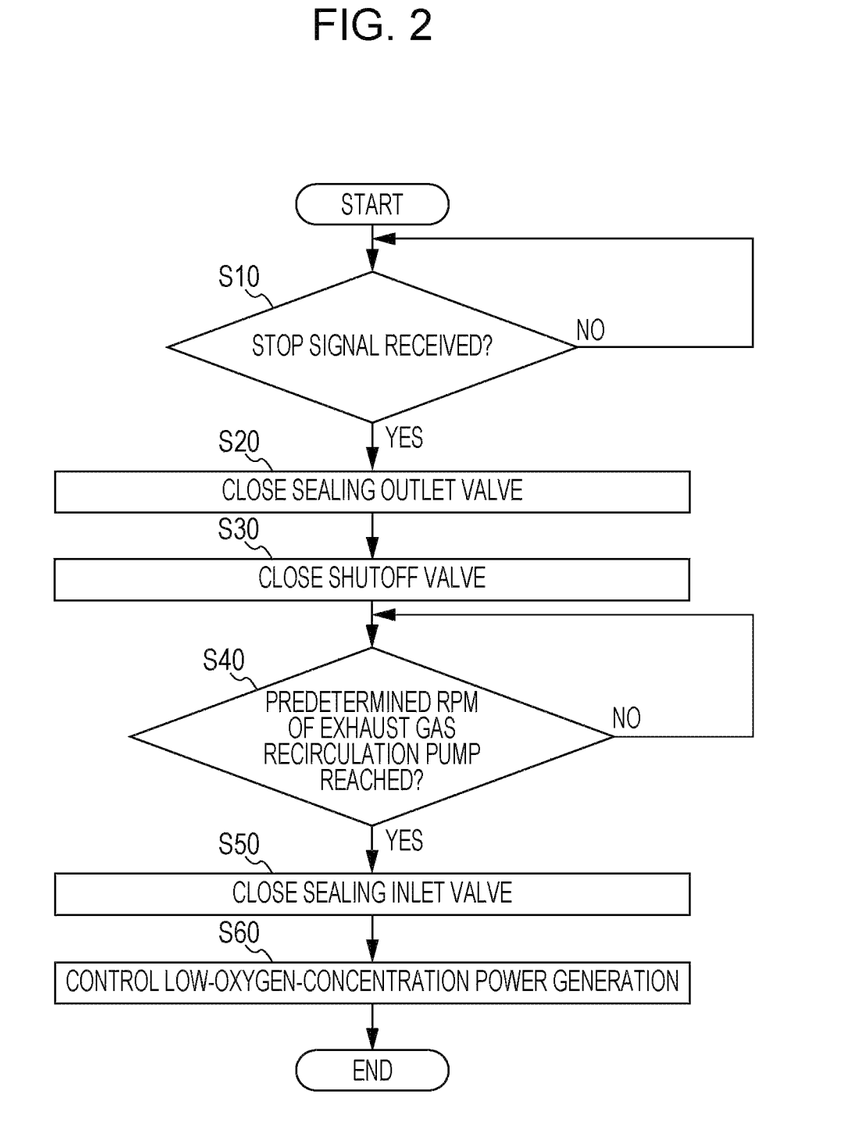
FIG. 2 is a flowchart illustrating a control operation of a controller (i.e., a method for stopping power generation in the fuel cell system) according to the embodiment.
Figure 3:
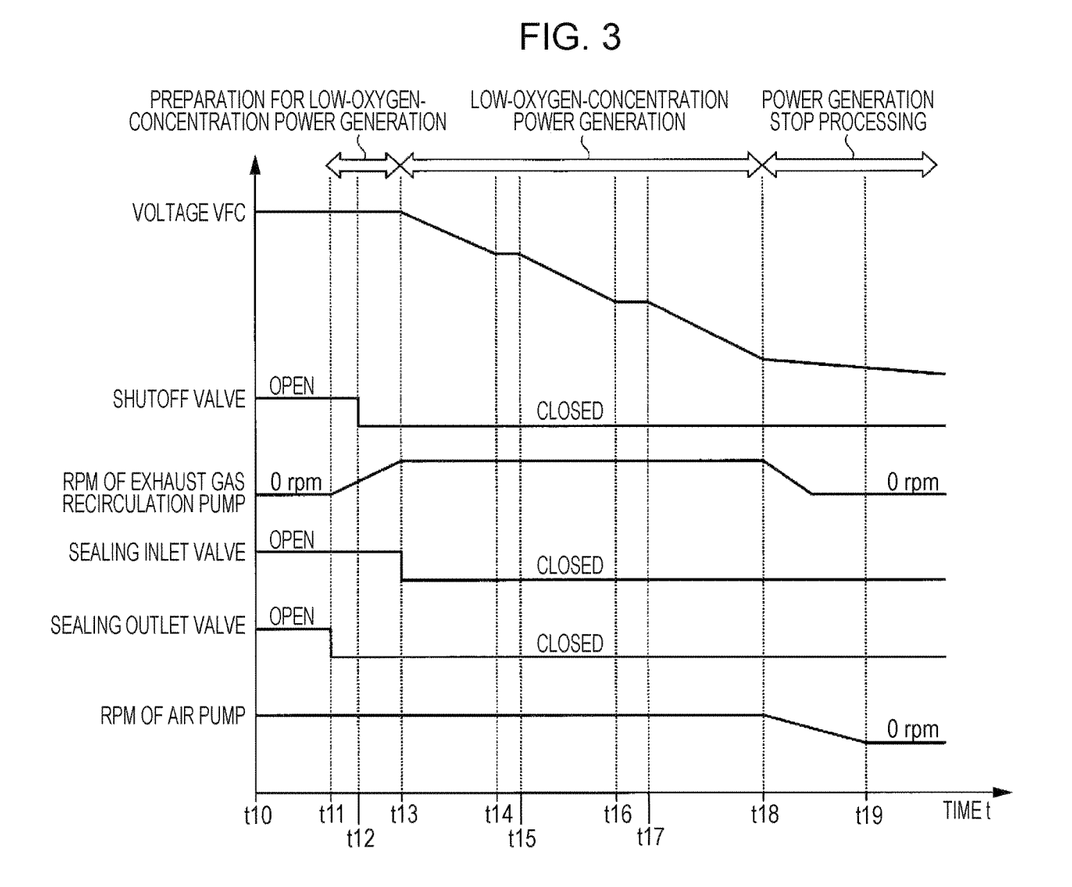
FIG. 3 is a timing diagram illustrating the control operation of the controller (i.e., the method for stopping power generation in the fuel cell system) according to the embodiment.

FIG. 2 is a flowchart illustrating a control operation of the controller 41 according to the embodiment. FIG. 3 is a timing diagram illustrating the control operation of the controller 41. Hereinafter, each step in FIG. 2 will be described with reference to time t11 to time t19 shown in FIG. 3. The controller 41 rotates the air pump 13 at a predetermined number of revolutions per minute (rpm) during the period from time t10 to time t18, and then reduces the rpm of the air pump 13 to zero from time t18 to time t19 to stop the rotation of the air pump 13. The following description will not refer to the control operation of the controller 41 for controlling the rpm of the air pump 13.

At time t10, as a signal receiving step, the controller 41 determines whether a stop signal which instructs the fuel cell system 10 to stop has been received, for example, through a driver's input operation of the switch 2 (step S10). If determining that the stop signal has not been received (NO in step S10), the controller 41 repeats the determining operation in step S10. If the controller 41 determines that the stop signal has been received (YES in step S10), the process proceeds to step S20.

At time t11, the controller 41 closes the sealing outlet valve 16 to start preparation for power generation in a low oxygen concentration (hereinafter referred to as "low-oxygen-concentration power generation") (step S20). Next, at time t12, the controller 41 closes the shutoff valve 23 to stop supply of hydrogen (step S30).

Next, the controller 41 determines whether the rpm of the exhaust gas recirculation pump 19 has reached a predetermined value (step S40). In this example, the rpm of the exhaust gas recirculation pump 19 reaches the predetermined value at time t13. If determining that the rpm of the exhaust gas recirculation pump 19 has not reached the predetermined value (NO in step S40), the controller 41 repeats the determining operation in step S40. On the other hand, if the controller 41 determines that the rpm of the exhaust gas recirculation pump 19 has reached the predetermined value (YES in step S40), the process proceeds to step S50.

At time t13, the controller 41 closes the sealing inlet valve 15 to end the preparation for the low-oxygen-concentration power generation and start the low-oxygen-concentration power generation (step S50). In the low-oxygen-concentration power generation, the controller 41 drives the exhaust gas recirculation pump 19 to circulate a cathode off-gas through the cathode 11B, and brings the contactor 39 into a connected state to perform power generation of the fuel cell stack 11. This reduces the oxygen concentration and increases the nitrogen concentration in the cathode 11B, allows discharge from the fuel cell stack 11 to the electrical load, and lowers the voltage of the fuel cell stack 11.

In the low-oxygen-concentration power generation from time t13 to time t18, the controller 41 controls the state of power generation of the fuel cell stack 11 on the basis of the current IFC detected by the current sensor and the voltage VFC detected by the voltage sensor 38 (step S60). Specifically, the controller 41 controls the state of power generation of the fuel cell stack 11 by lowering the voltage VFC while controlling the voltage VFC in such a way that the current IFC does not exceed a predetermined threshold (predetermined current value).

After the oxygen concentration in the fuel cell stack 11 is sufficiently reduced, the controller 41 stops the low-oxygen-concentration power generation and starts power generation stop processing.

Figure 4:
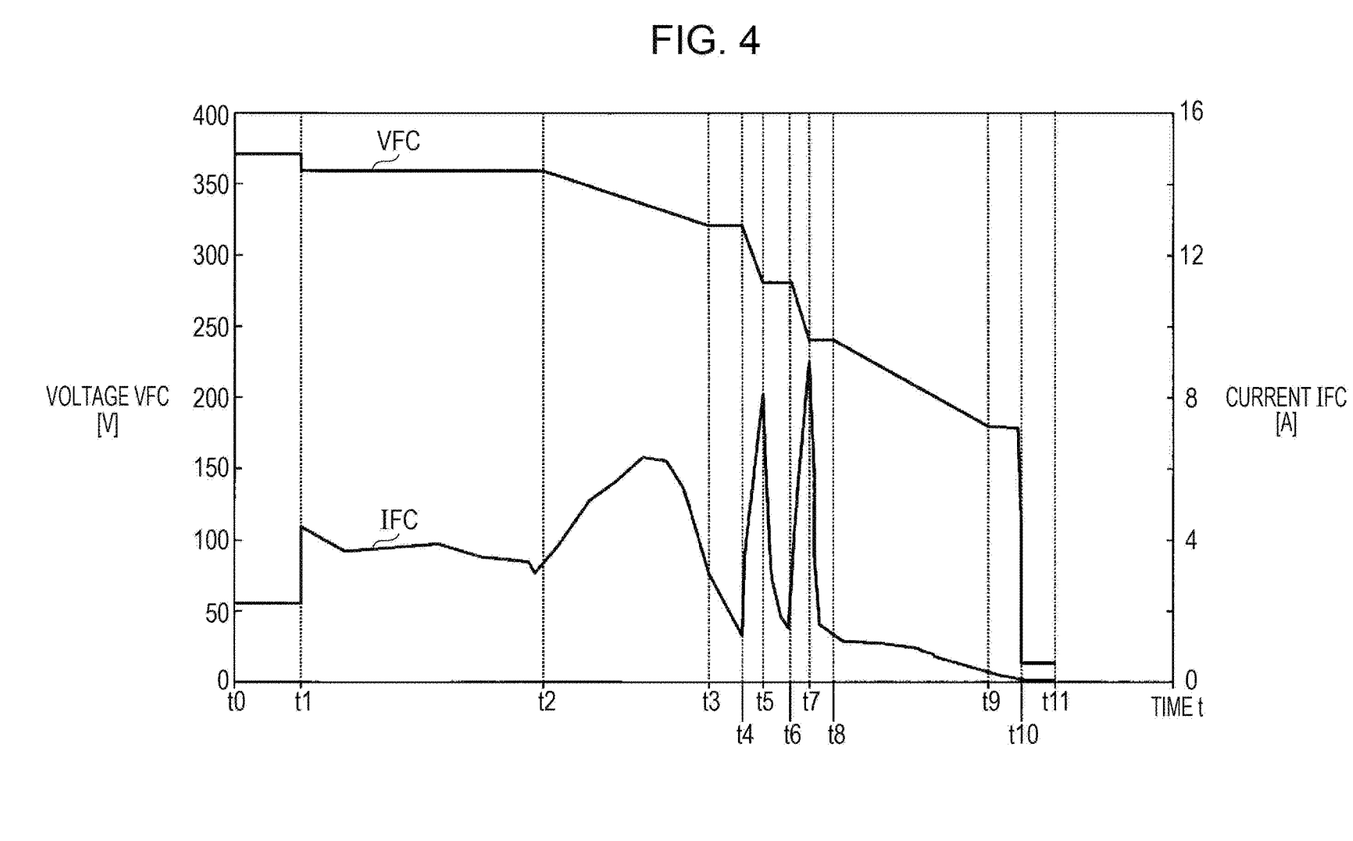
FIG. 4 is a graph showing temporal changes in voltage VFC and current IFC in low-oxygen-concentration power generation according to the embodiment.

With reference to FIG. 4, an operation for controlling the voltage VFC in the low-oxygen-concentration power generation will be described. FIG. 4 is a graph showing temporal changes in voltage VFC (changes in voltage VFC with respect to elapsed time) and current IFC in the low-oxygen-concentration power generation.

The fuel cell stack 11 has a characteristic in which the voltage VFC decreases as the current IFC increases (I-V characteristic). The fuel cell stack 11 controls the current IFC by controlling the voltage VFC in accordance with the I-V characteristic.

Since no additional gas is supplied during the low-oxygen-concentration power generation, the amount of gas that reacts in the fuel cell stack 11 is below the level required for power generation. Therefore, in the low-oxygen-concentration power generation, a rapid lowering of the voltage VFC of the fuel cell stack 11 causes a rapid increase in current IFC, and this leads to partial deficiency in the amount of gas required for power generation (e.g., lack of stoichiometry on the side of the anode 11A). Thus, if the amount of gas in part of the fuel cell stack 11 is below the level required for power generation, a deterioration of the fuel cell stack 11 is accelerated in this part (particularly in the solid polymer electrolyte membrane 11C). The deterioration of the fuel cell stack 11 means that the I-V characteristic of the fuel cell stack 11 during power generation (I-V performance) deteriorates. Also, the deterioration of the I-V characteristic (I-V performance) means that when a given current IFC is output during power generation of the fuel cell stack 11, the corresponding voltage VFC is lower than that before the deterioration. Also, when the fuel cell stack 11 deteriorates, a current higher than that before the deterioration is required to obtain a given output from the fuel cell stack 11; that is, the efficiency of power generation is lowered.

Thus, in the low-oxygen-concentration power generation, as shown in FIG. 4, the controller 41 lowers the voltage VFC while preventing the current IFC from exceeding a predetermined threshold. The predetermined threshold is a value determined in advance by an experiment or the like to prevent partial deficiency in the amount of gas in the fuel cells of the fuel cell stack 11. For example, assume that the predetermined threshold is set to 12 amperes (A). In this case, the controller 41 lowers the voltage VFC while preventing the current IFC from exceeding 12 A.

In this example, the controller 41 controls the low-oxygen-concentration power generation during the period from time t2 to time t10 shown in FIG. 4. Specifically, during the period from time t2 to time t3, the controller 41 controls the voltage VFC to gradually decrease with time. At the same time, the current IFC increases from about 3 A to about 6 A, but does not exceed 12 A (predetermined threshold). Next, during the period from time t3 to time t4, the controller 41 controls the voltage VFC to be kept constant. Next, during the period from time t4 to time t5, the controller 41 rapidly lowers the voltage VFC with time. This causes the current IFC to increase from about 1.5 A to about 8 A. At this point, the controller 41 determines that the value of the current IFC is rapidly approaching 12 A (predetermined threshold). On the basis of this determination, during the period from time t5 to time t6, the controller 41 controls the voltage VFC to be kept constant. That is, the controller 41 makes the slope of the drop of the voltage VFC during the period from time t5 to time t6 smaller than the slope of the drop of the voltage VFC during the period from time t4 to time t5. Thus, during the period from time t5 to time t6, the current IFC rapidly decreases from about 8 A to about 1.5 A. That is, the controller 41 controls the slope of the drop of the voltage VFC to prevent the current IFC from exceeding 12 A (predetermined threshold). During the period from time t6 to time t8, the controller 41 controls the slope of the drop of the voltage VFC in the same manner as during the period from time t4 to time t6.

As described above, the controller 41 lowers the voltage VFC while varying the temporal change (slope) of the voltage VFC on the basis of a predetermined value of the current IFC. The controller 41 varies the temporal change (slope) of the voltage VFC at every inflection point. An inflection point is a point on the graph of the voltage VFC at a time point at which the temporal change (slope) of the voltage VFC varies. In the example described above, a point on the graph of the voltage VFC at each of the time points from time t3 to time t8 is an inflection point.

During the period from time t8 to time t9, the controller 41 controls the voltage VFC to gradually decrease with time. During the period from time t9 to time t10, the controller 41 causes the voltage VFC to rapidly drop with time. Then, the controller 41 ends the control of the low-oxygen-concentration power generation.

As described above, in a state where no additional gas is supplied, the controller 41 controls the voltage VFC on the basis of the predetermined threshold of the current IFC. That is, in the low-oxygen-concentration power generation, the controller 41 lowers the voltage VFC in such a way to prevent partial deficiency in the amount of gas in the fuel cells of the fuel cell stack 11. Thus, the controller 41 can reduce deterioration of the fuel cell stack 11 (particularly the solid polymer electrolyte membrane 11C).

Figure 7:
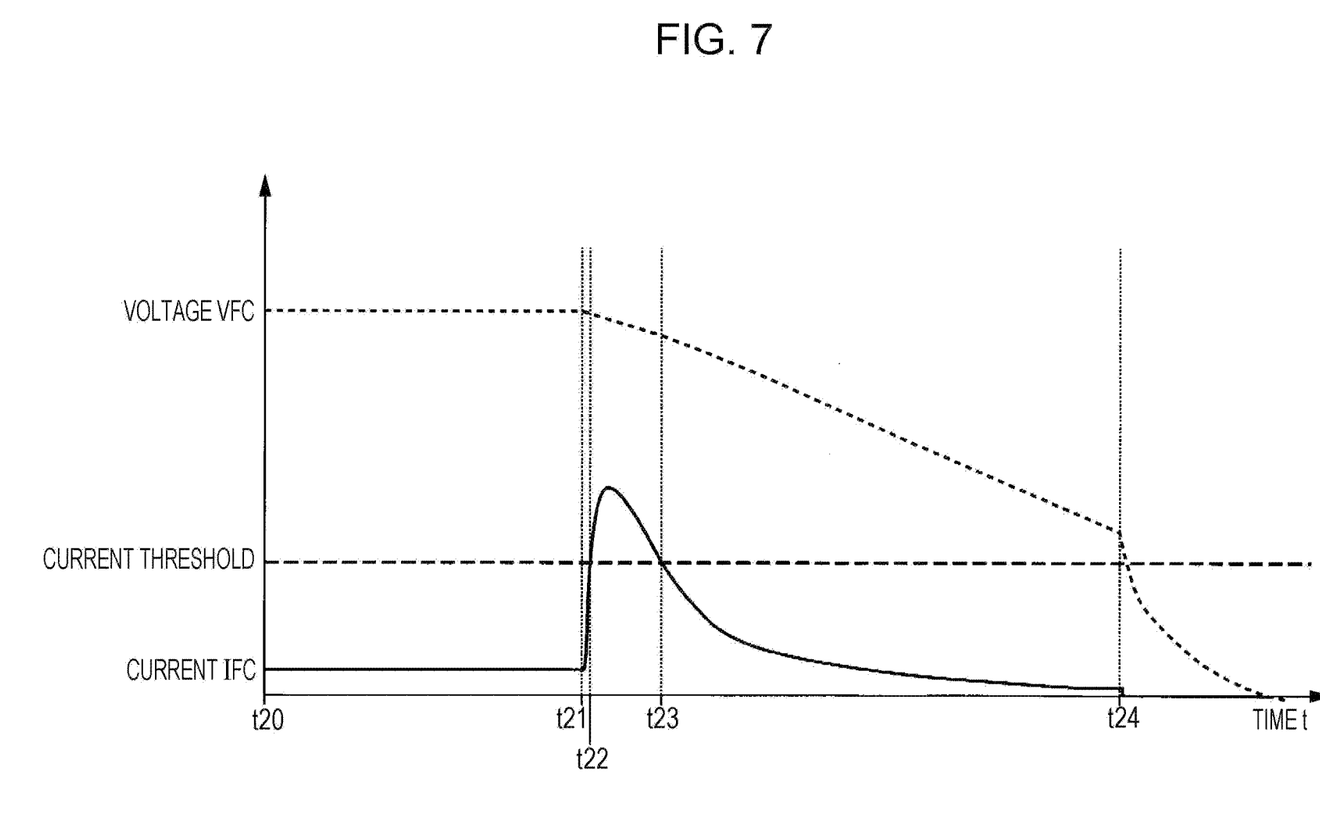
FIG. 7 is a graph showing temporal changes in voltage VFC and current IFC in low-oxygen-concentration power generation according to the related art.

With reference to FIG. 7, a description will be given of how the voltage VFC is controlled during low-oxygen-concentration power generation according to the related art.

FIG. 7 is a graph showing temporal changes in voltage VFC and current IFC during low-oxygen-concentration power generation according to the related art. The low-oxygen-concentration power generation is performed during the period from time t21 to time t24 in FIG. 7. In this example of the related art, during the period from time t21 to time t24, the voltage VFC is controlled to gradually decrease with a constant slope as time passes. In this case, the current IFC exceeds a current threshold (e.g., 12 A) during the period from time t22 to time t23. That is, the fuel cell stack 11 (in particular, the solid polymer electrolyte membrane 11C) deteriorates due to partial deficiency in the amount of gas in the fuel cell stack 11 during the period from time t22 to time t23.

Figure 5:
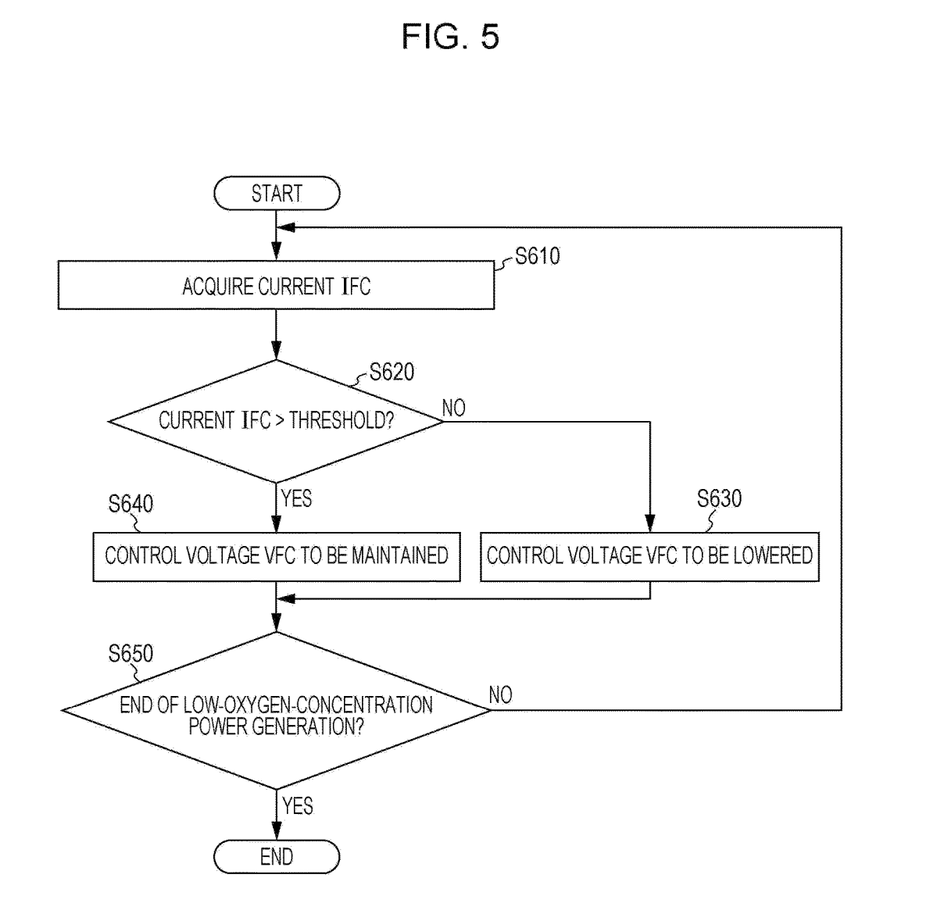
FIG. 5 is a flowchart illustrating the control operation performed by the controller to control low-oxygen-concentration power generation (i.e., the method for stopping power generation in the fuel cell system) according to the embodiment.

During the period from time t23 to time t24 in FIG. 7, the voltage VFC is controlled in such a way that the current IFC does not exceed the threshold while the voltage VFC decreases with a constant slope. In this case, to prevent the current IFC from exceeding the threshold, the slope of the drop of the voltage VFC needs to be small. The slope of the drop of the voltage VFC controlled in accordance with the related art is smaller than that of the drop of the voltage VFC controlled by the controller 41 of the present embodiment described above. This means that the time required for the voltage VFC to be lowered to a predetermined level (e.g., voltage value at time t24) is longer than that in the case of the control done by the controller 41 of the present embodiment. That is, with the controller 41 of the present embodiment, the time required for the low-oxygen-concentration power generation can be made shorter than that with the related art. With reference to FIG. 5, how the controller 41 controls the voltage VFC will be specifically described.

FIG. 5 is a flowchart illustrating a control operation performed by the controller 41 to control low-oxygen-concentration power generation.

In step S60 in the flowchart of FIG. 2, the controller 41 repeats the process from step S610 to step S650 illustrated in FIG. 5. Specifically, the controller 41 acquires the current IFC detected by the current sensor (step S610). Next, the controller 41 determines whether the current IFC acquired in step S610 exceeds a predetermined threshold (step S620). More specifically, in step S620, the controller 41 determines whether the current IFC exceeds the predetermined threshold on the basis of the change rate of the current IFC. If the change rate of the current IFC is so high that the current IFC will exceed the predetermined threshold before the next determination, the controller 41 determines that the current IFC exceeds the predetermined threshold. If the controller 41 determines that the current IFC does not exceed the predetermined threshold (NO in step S620), the process proceeds to step S630. If the change rate of the current IFC is low, the controller 41 determines that the current IFC does not exceed the predetermined threshold. If the controller 41 determines that the current IFC exceeds the predetermined threshold (YES in step S620), the process proceeds to step S640.

In step S630, the controller 41 controls the voltage VFC to be lowered. In this example, the controller 41 controls the voltage VFC to be lowered at a constant rate.

On the other hand, in step S640, the controller 41 controls the voltage VFC not to be lowered. In this example, the controller 41 controls the voltage VFC to be kept at a constant level.

Next, the controller 41 determines whether to end the low-oxygen-concentration power generation (step S650). The controller 41 can determine whether to end the low-oxygen-concentration power generation on the basis of various conditions. For example, the controller 41 determines to end the low-oxygen-concentration power generation when the voltage VFC reaches a predetermined level. The controller 41 may determine to end the low-oxygen-concentration power generation after the elapse of a predetermined time from the start of the low-oxygen-concentration power generation. If the controller 41 determines not to end the low-oxygen-concentration power generation (NO in step S650), the process returns to step S610, at which the controller 41 starts the process of controlling the low-oxygen-concentration power generation again. On the other hand, if determining to end the low-oxygen-concentration power generation (YES in step S650), the controller 41 ends the process of controlling the low-oxygen-concentration power generation.

As described above, in the method for stopping power generation in the fuel cell system 10 according to the present embodiment, the voltage VFC is controlled, during the low-oxygen-concentration power generation, to prevent partial deficiency in the amount of gas required for power generation (e.g., lack of stoichiometry on the side of the anode 11A). Therefore, in the method for stopping power generation in the fuel cell system 10 according to the present embodiment, it is possible to reduce deterioration of the fuel cell stack 11 (in particular, the solid polymer electrolyte membrane 11C) caused by partial deficiency in the amount of gas required for power generation.

Also, in the method for stopping power generation in the fuel cell system 10 according to the present embodiment, the slope of the drop of the voltage VFC is controlled on the basis of a predetermined value (threshold) of the current IFC. Therefore, the voltage VFC can be lowered more rapidly than in the case of lowering the voltage VFC with a constant slope. That is, in the method for stopping power generation in the fuel cell system 10 according to the present embodiment, the time required for low-oxygen-concentration power generation can be made shorter than in the case of lowering the voltage VFC with a constant slope.

(Modification)

A modified control operation of the controller 41 will be described with reference to FIG. 6.

Figure 6:
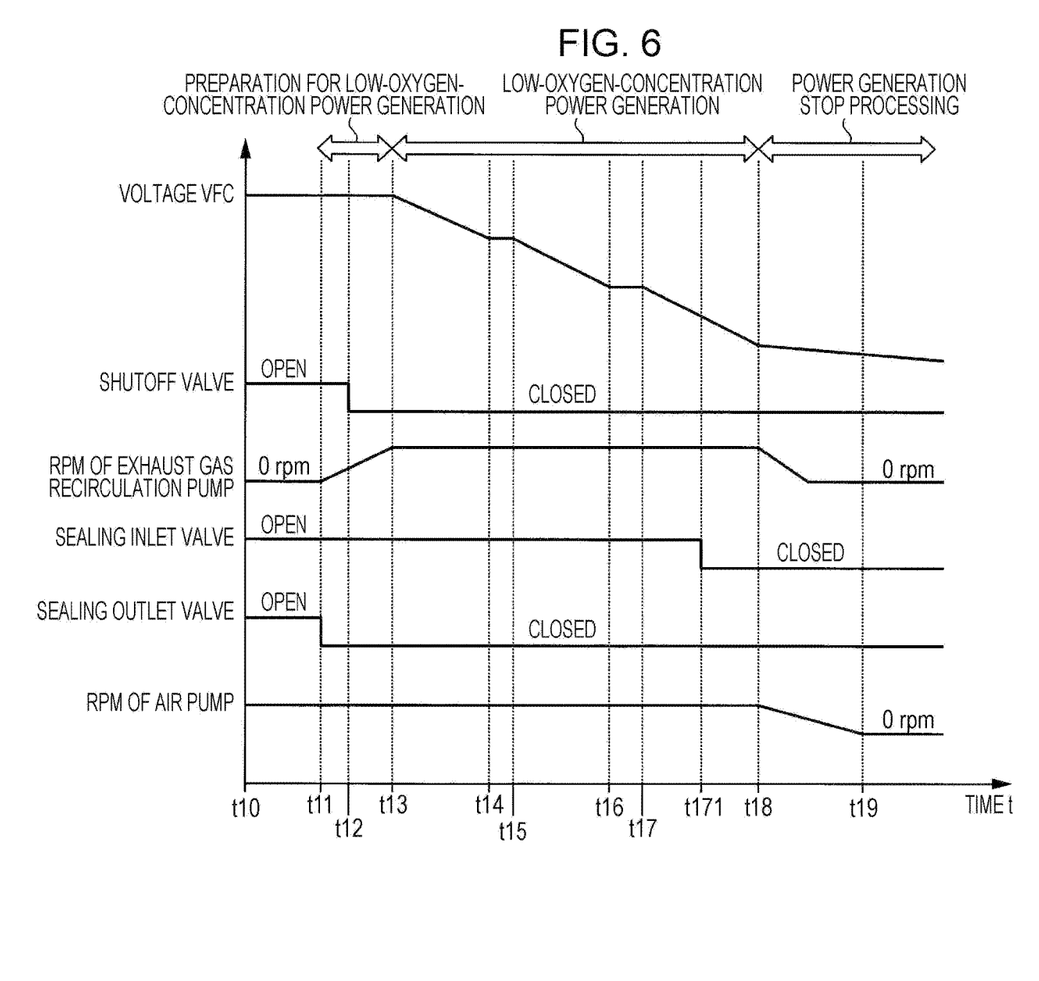
FIG. 6 is a timing diagram illustrating a modification of the control operation of the controller (i.e., the method for stopping power generation in the fuel cell system) according to the embodiment.

FIG. 6 is a timing diagram illustrating a modified control operation of the controller 41. As illustrated in FIG. 6, the controller 41 may control the low-oxygen-concentration power generation by delaying the closing of the sealing inlet valve 15. In this modification, the controller 41 closes the sealing inlet valve 15 at time t171 during the low-oxygen-concentration power generation, instead of time t13. By delaying the closing of the sealing inlet valve 15, the controller 41 can facilitate discharge of water remaining on the side of the cathode 11B. Therefore, in this modification, the controller 41 can stabilize the behavior (flow) of the gas (oxidant gas) on the side of the cathode 11B and allows more stable low-oxygen-concentration power generation.

The embodiments described above are merely examples, and the present disclosure is not to be interpreted as being limited to the embodiments. In the foregoing description, "an output current of the fuel cell unit has a predetermined relationship with a predetermined current reference value" means that the controller performs a control operation to prevent the current IFC from exceeding a predetermined threshold, as described in the explanation for step S60 of FIG. 2. It also means that the controller performs a control operation such that, for example, during a predetermined period from an early stage of the low-oxygen-concentration power generation, the current IFC is within a range of the predetermined current value defined by the maximum and minimum values. By this control operation, the time required for low-oxygen-concentration power generation can also be reduced.

A method according to a first aspect of the present disclosure is a method for stopping power generation in a fuel cell system which includes a fuel cell unit configured to generate electric power using a fuel in at least one anode and an oxidant in at least one cathode, a fuel gas supply unit configured to supply a fuel gas containing the fuel to the anode, an oxidant gas supply unit configured to supply an oxidant gas containing the oxidant to the cathode, and an oxidant gas concentration reducing unit configured to reduce a concentration of the oxidant gas in the cathode. The method includes lowering an output voltage of the fuel cell unit while controlling a slope of a temporal change in the output voltage such that an output current of the fuel cell unit has a predetermined relationship with a predetermined current reference value.

In the method according to the first aspect, it is possible to rapidly lower the output voltage while preventing partial deficiency in the amount of gas in the fuel cell unit.

In the method according to a second aspect of the present disclosure, the temporal change in the output voltage may contain a plurality of inflection points, and the output voltage may be lowered while slopes between adjacent inflection points are controlled such that the output current has a predetermined relationship with the predetermined current reference value.

In the method according to the second aspect, it is possible to properly control the temporal change in the output voltage of the fuel cell unit in such a way to prevent partial deficiency in the amount of gas.

In the method according to a third aspect of the present disclosure, the output voltage may be lowered while the slope of the temporal change in the output voltage is controlled such that the output current does not exceed the predetermined current reference value.

In the method according to the third aspect, it is possible to easily and properly carry out the control on the basis of the output current and the threshold while preventing partial deficiency in the amount of gas in the fuel cell unit.

In the method according to a fourth aspect of the present disclosure, the oxidant gas concentration reducing unit may include a shutoff unit configured to shut off the supply of the oxidant gas to the cathode through the oxidant gas supply unit, and the shutoff unit may shut off the supply of the oxidant gas to the cathode when the output voltage becomes lower than a predetermined voltage.

In the method according to the fourth aspect, it is possible to stabilize the state of power generation during lowering of the output voltage.

Obviously, numerous modifications and variations of the present invention are possible in light of the above teachings. It is therefore to be understood that within the scope of the appended claims, the invention may be practiced otherwise than as specifically described herein.

What is claimed is:

1. A method for stopping a fuel cell system including:
   a fuel cell unit configured to generate electric power using a fuel in an anode and an oxidant in a cathode;
   a fuel gas supply unit configured to supply a fuel gas containing the fuel to the anode;
   an oxidant gas supply unit configured to supply an oxidant gas containing the oxidant to the cathode; and
   an oxidant gas concentration reducing unit configured to reduce a concentration of the oxidant gas in the cathode,
   the method comprising lowering an output voltage of the fuel cell unit while controlling a slope of a temporal change in the output voltage such that an output current of the fuel cell unit has a predetermined relationship with a predetermined current reference value,
   wherein the oxidant gas concentration reducing unit includes a shutoff unit configured to shut off the supply of the oxidant gas to the cathode through the oxidant gas supply unit, and
   the shutoff unit shuts off the supply of the oxidant gas to the cathode when the output voltage becomes lower than a predetermined voltage.

2. The method according to claim 1, wherein the temporal change in the output voltage contains a plurality of inflection points, and the output voltage is lowered while slopes between adjacent inflection points are controlled such that the output current has a predetermined relationship with the predetermined current reference value.

3. The method according to claim 1, wherein the output voltage is lowered while the slope of the temporal change in the output voltage is controlled such that the output current does not exceed the predetermined current reference value.

4. The method according to claim 2, wherein the output voltage is lowered while the slope of the temporal change in the output voltage is controlled such that the output current does not exceed the predetermined current reference value.

* * * * *